United States Patent [19]
Yamamura et al.

[11] Patent Number: 6,079,659
[45] Date of Patent: Jun. 27, 2000

[54] ELECTRIC MOTOR AND METHOD OF MANUFACTURING THE SAME

[75] Inventors: Masashi Yamamura; Terumitsu Takahashi, both of Hamamatsu, Japan

[73] Assignee: Asmo Co., Ltd., Japan

[21] Appl. No.: 09/186,983

[22] Filed: Nov. 4, 1998

[30] Foreign Application Priority Data

Nov. 25, 1997 [JP] Japan .................................. 9-323156

[51] Int. Cl.$^7$ .................................................. H02K 15/09
[52] U.S. Cl. ............................... 242/433.2; 242/433.3; 29/596
[58] Field of Search ............................. 242/433, 433.1, 242/433.2, 433.3; 29/596

[56] References Cited

U.S. PATENT DOCUMENTS

| | | | |
|---|---|---|---|
| 3,705,459 | 12/1972 | Biddison | 242/433.3 X |
| 3,913,220 | 10/1975 | Miller | 242/433 X |
| 4,520,965 | 6/1985 | Kimura et al. | 242/433.3 |
| 5,267,699 | 12/1993 | Lombardi | 242/433.3 |

FOREIGN PATENT DOCUMENTS 55-125069  9/1980  Japan .
5-91699   4/1993  Japan .

*Primary Examiner*—Donald P. Walsh
*Assistant Examiner*—Emmanuel M. Marcelo
*Attorney, Agent, or Firm*—Fish & Richardson P.C.

[57] ABSTRACT

A method of winding an armature of a four-poled dc motor composed of the armature having (4m+1) slots and a commutator having the same number of commutator segments as the slots. The method employs a first and second coil formers. Each of formers has a pair of guiding surfaces around the armature so that the first coil former is located at a pair of slots to be wound at a m-slot pitch and the second former is located at another pair of slots to be wound at a m-slot pitch. Then, two wires are respectively wound on the first and second coil formers concurrently to be guided into the pairs of slots to be wound respectively. Subsequently, the armature is rotated by an angle 180+180/(4m+1) so that two wires can be wound repeatedly. Thereafter, the armature is rotated, and the wire is wound on the first coil former only to be guided into another pair of slots. This step is repeated three times.

8 Claims, 10 Drawing Sheets

ELECTRIC MOTOR AND METHOD OF MANUFACTURING THE SAME

CROSS REFERENCE TO RELATED APPLICATION

The present application is based on and claims priority from Japanese Patent Application No. Hei 9-323156 filed on Nov. 25, 1997, the contents of which are incorporated herein by reference.

BACKGROUND OF THE INVENTION

1. Field of the Invention

The present invention relates to an electric motor and a method of manufacturing an armature thereof.

2. Description of the Related Art

When an armature winding is wound in an armature core having an odd number of slots such as 13 slots, 13 winding steps are usually necessary, while only as many steps as a half the number of slots such as 6 steps are necessary to wind an armature having an even number of slots such as 12 slots.

SUMMARY OF THE INVENTION

A main object of the invention is to provide an improved method of manufacturing a four-poled dc motor composed of an armature that has 5, 9, 13 or any number of slots that can be expressed by (4m+1) and a commutator that has the same number of commutator segments as the slots.

In a method of winding an armature of the above-stated four-poled dc motor according to a main feature of the invention, a first step is placing on opposite sides of one of the core members a first and second coil formers each of which has a pair of guiding surfaces around the armature so that the pair of guiding surfaces of the first coil former can be located to guide a wire into a first pair of the slots disposed at an m-slot pitch from each other and the pair of guiding surfaces of the second former is located to guide another wire into a second pair of the slots disposed at an m-slot pitch from each other. A second step is winding the wires respectively on the first and second coil formers concurrently to guide the wires into the first and second pair of slots respectively.

As a result, two separate winding steps for four slots to be wound can be carried out concurrently. The concurrent winding steps can be repeated after rotating the armature at an angle 180+180/(4m+1). After the concurrent winding is repeated (2m−2) times, the armature is rotated in the same manner, and the step of winding the wire by the first coil former only is carried out three times.

Thus, the concurrent winding steps can be adopted as many as possible so that a total number of the winding steps can be reduced.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

A first embodiment is described with reference to FIGS. 1A–4.

Figure 2A:
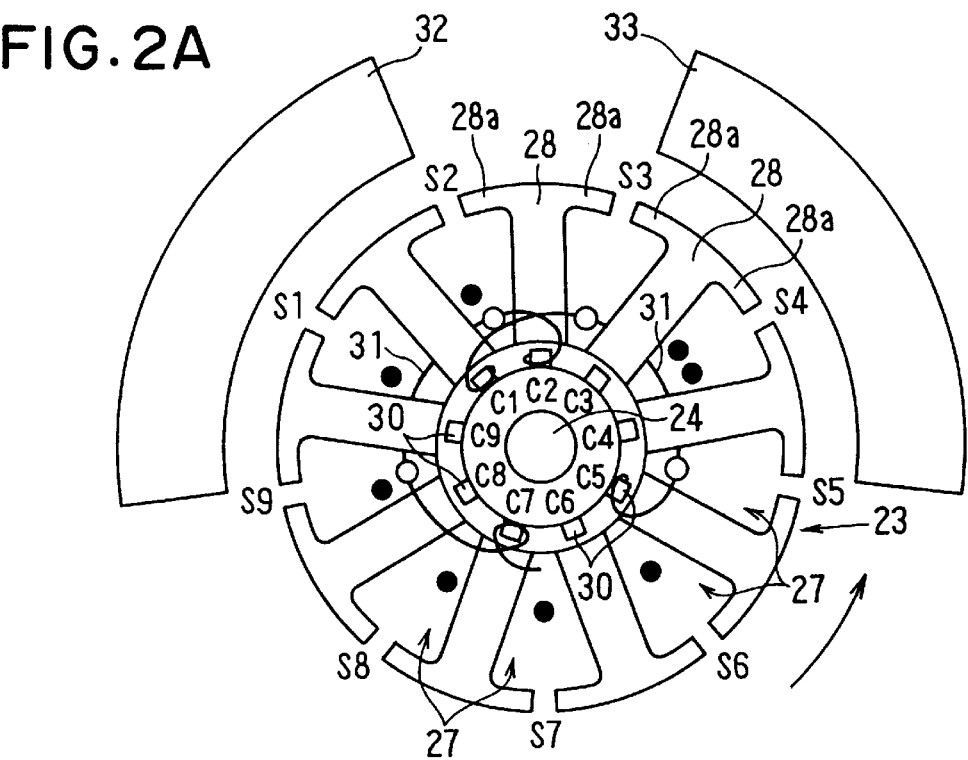
FIGS. 2A and 2B are schematic diagrams illustrating the method of winding an armature coil to an armature core according to the first embodiment.
Figure 2B:
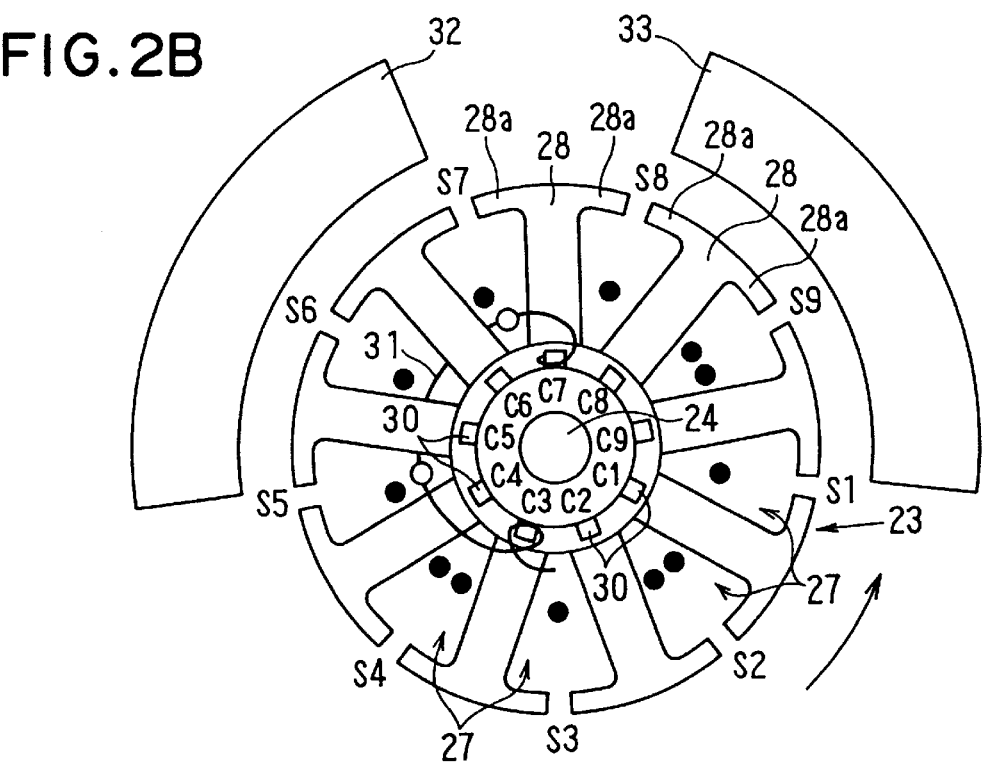
Figure 3A:
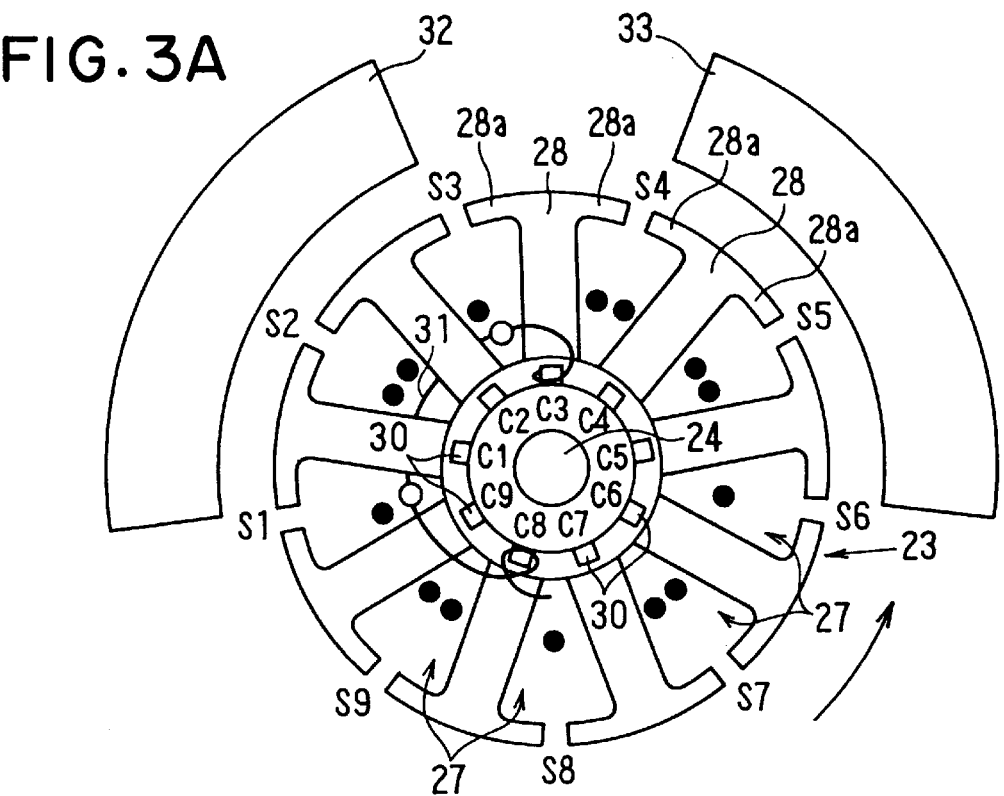
FIGS. 3A and 3B are schematic diagrams illustrating the method of winding an armature coil to an armature core according to the first embodiment.
Figure 3B:
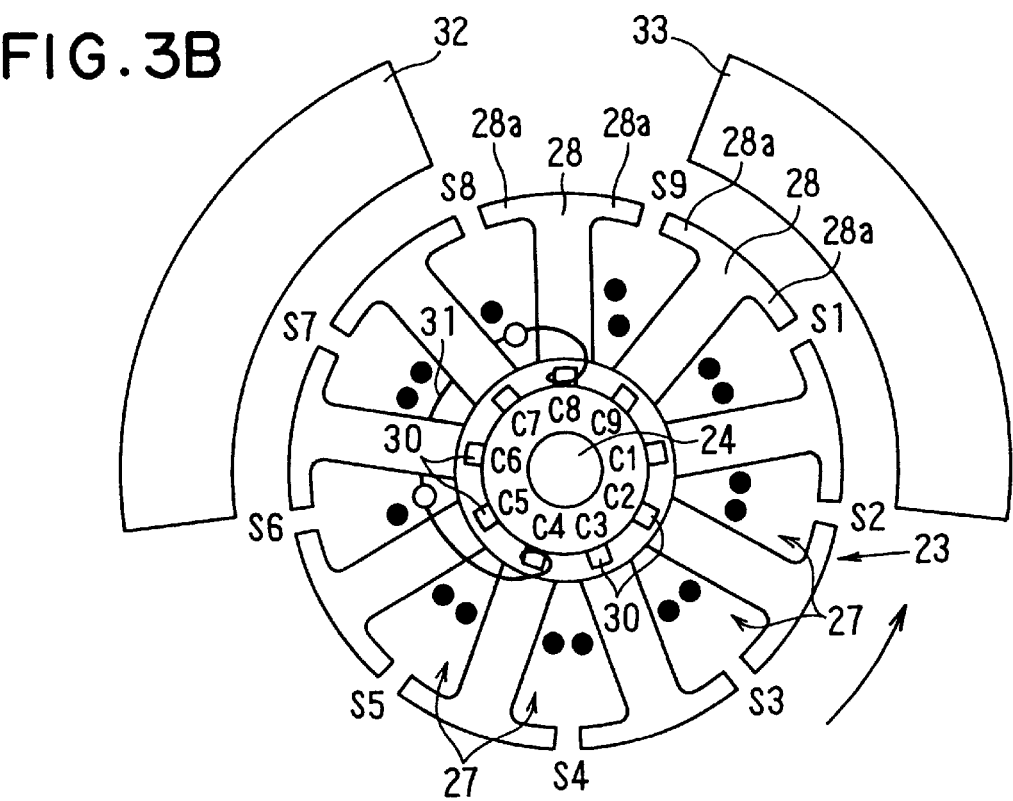
Figure 4:
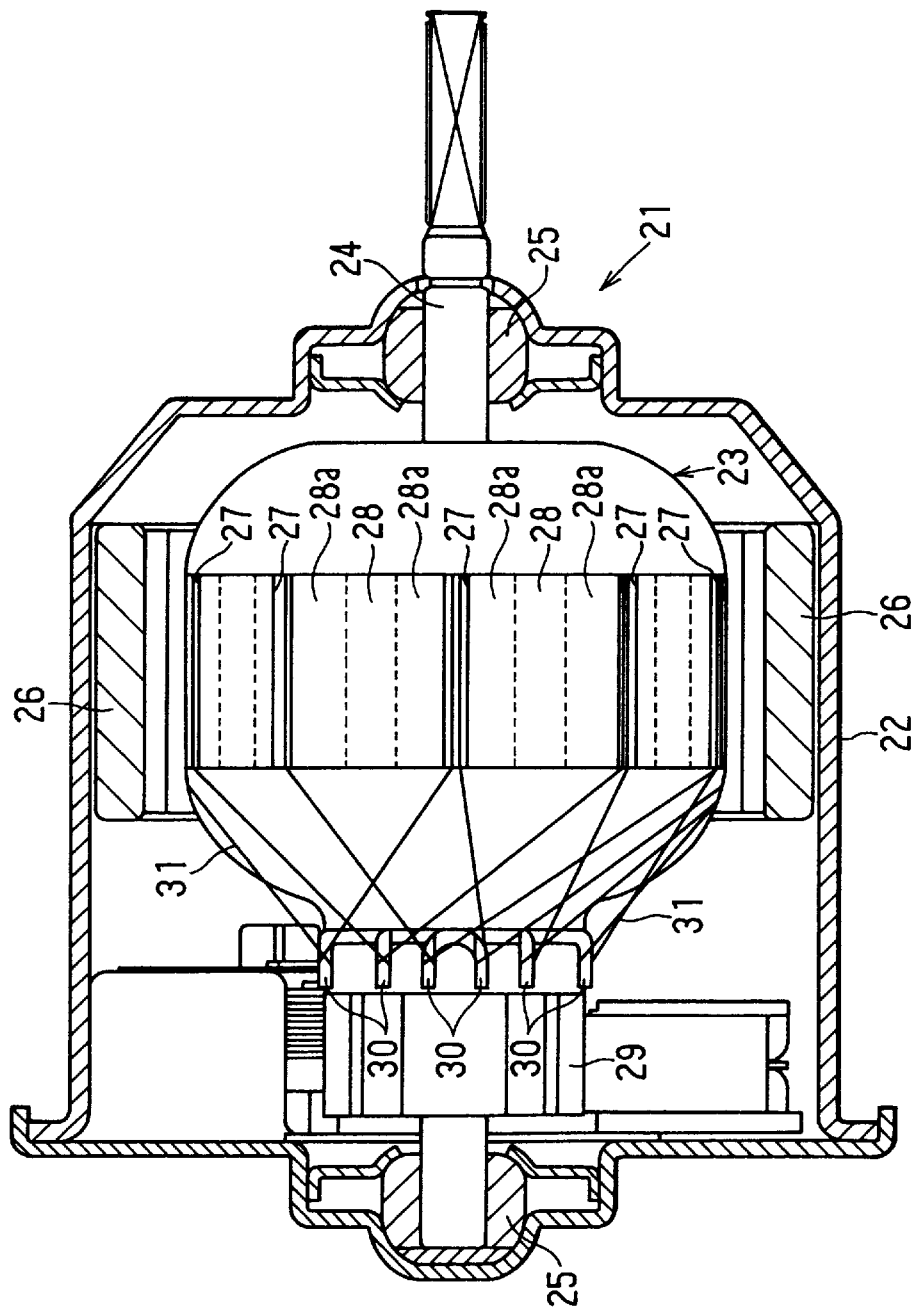
FIG. 4 is a schematic cross-sectional view of an electric motor having an armature to which the armature coil is wound according to the first embodiment of the invention.
Figure 10:
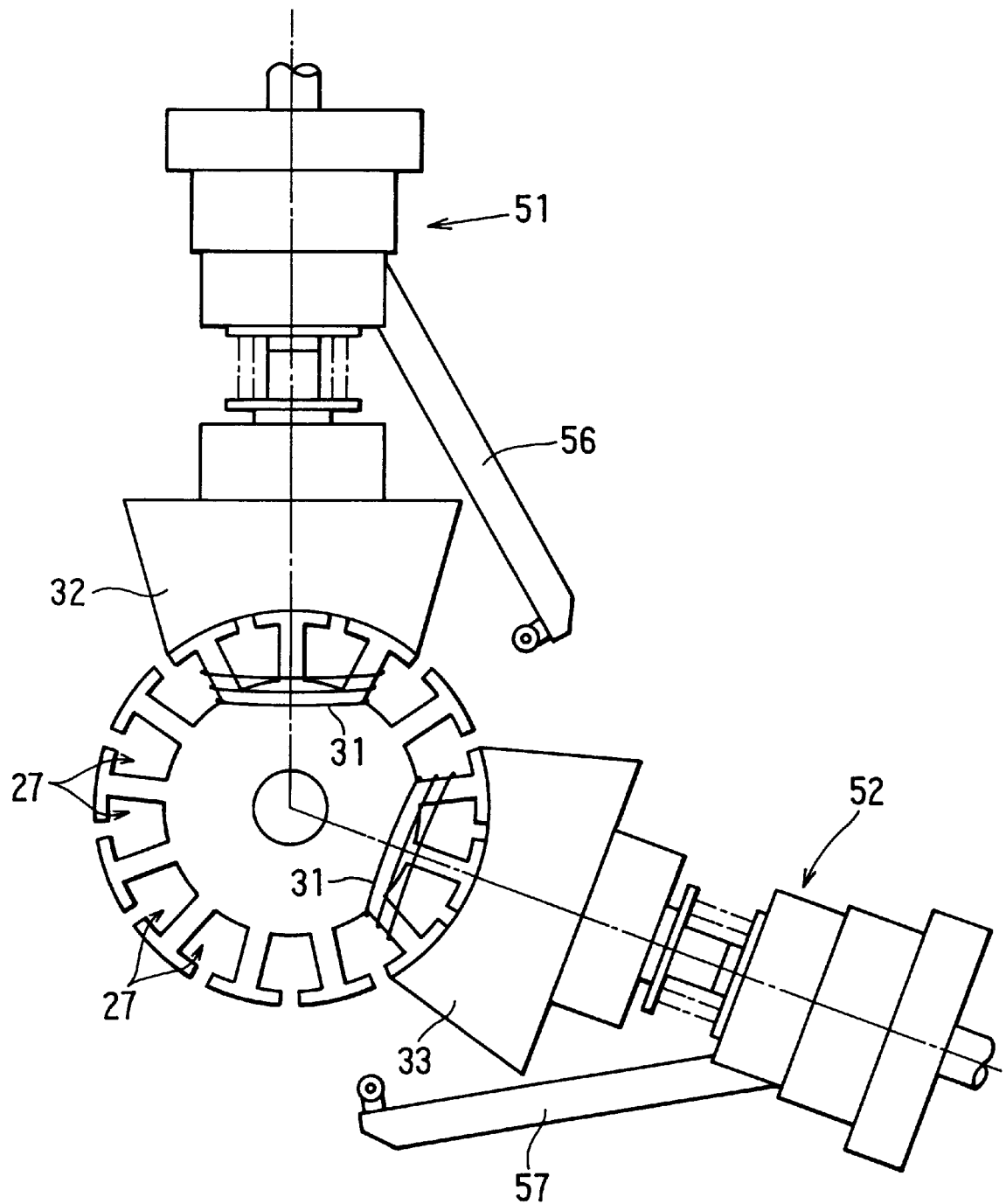
FIG. 10 is a schematic diagram illustrating a winding tool.

In FIG. 4, motor 21 is composed of motor housing 22, armature 23, shaft 24, four magnetic poles 26 and cylindrical commutator 29. Shaft 24 is supported by a pair of bearings 25 at the opposite ends thereof. Four magnetic poles are disposed at equal intervals on the inner periphery of motor housing 22 to surround armature 23. Armature 23 has nine slots 27 formed on the outer periphery thereof to extend in the longitudinal direction. In the meantime, the number of nine is one of the numbers that can be expressed by (4m+1) when m is 2. Each of slots has a wedge-shaped cross-section as shown in FIGS. 1A–3B. Armature 23 has nine core members 28 having teeth 28a extending in the circumferentially opposite directions over adjacent slots. Commutator 29 is composed of nine arc-shaped commutator segments on the periphery thereof and is fixed to an end of armature 23. Each of commutator segments has rise-up terminal 30 which is shifted in angle from the center of each of slots 27. Wire 31 is wound to core members and fixed to terminal 30 by winding tools 51, 52 composed of first or second coil former 32 or 33 and corresponding flyers 56 or 57 as shown in FIG. 10.

Figure 1A:
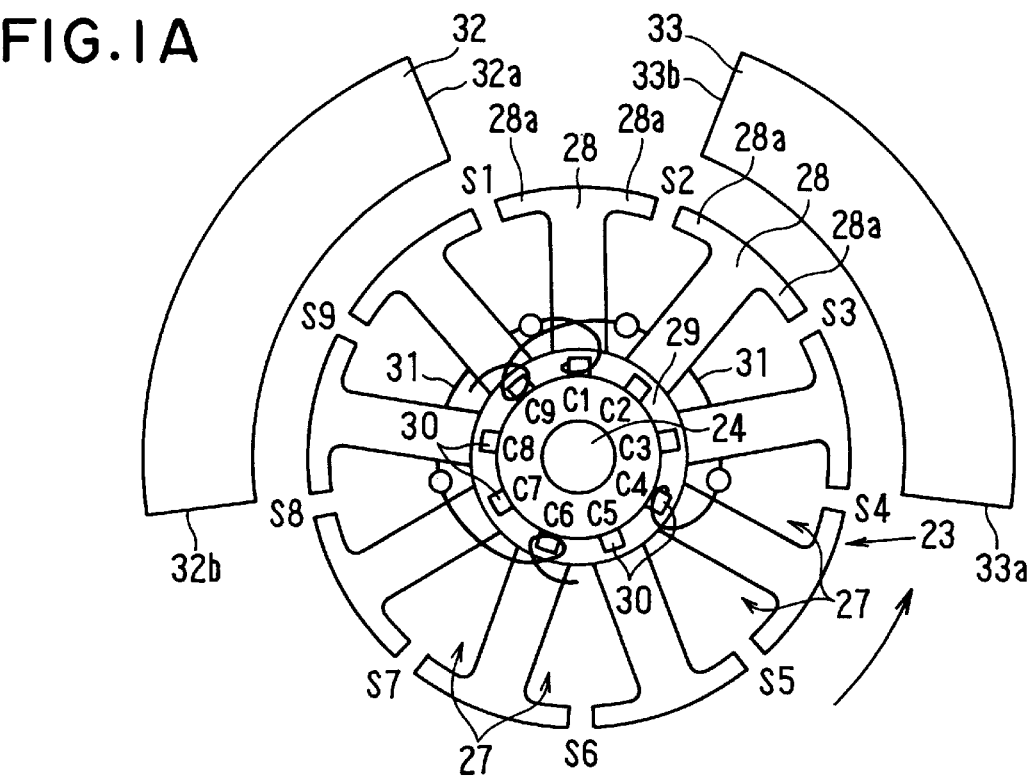
FIGS. 1A and 1B are schematic diagrams illustrating a method of winding an armature coil to an armature core according to a first embodiment of the invention.

As shown in FIG. 1A, each of coil formers 32, 33 has opposite guiding surfaces 32a, 32b or 33a, 33b for guiding wires into two slots disposed at a two-slot pitch corresponding to one-pole pitch in this embodiment. In other words, guiding surface 32a or 33a is located at slot S1 or S4, and guiding surface 32b or 33b is located at slot S8 or S2 that is disposed at a two-slot pitch from slot S1 or S4. Thus, first and second coil formers 32, 33 are disposed around armature 23 so that one of core members 28 is placed between two coil formers. Wire 31 is wound around former 32 (e.g. 30 turns) and inserted in slots S1, S8, and another wire 31 is wound around former 33 and inserted in slots S4, S2 by each of the flyers.

The winding is carried out through the following six steps.

First Step: As shown in FIG. 1A, an end of wire 31 is hooked on rise-up terminal 30 of commutator segment C1, and the following portion of wire 31 is wound around first former 32 and guided into slot S1 and slot S8 that is separate two-slot pitch from slot S1. The following portion of wire 31 is hooked on terminal 30 of segment C6 that is separate a four-segment pitch from segment C1. An end of another wire 31 is concurrently hooked on rise-up member 30 of commutator segment C4, and the following portion of wire 31 is wound around second former 33 and guided into slot S4 and slot S2 that is separate two-slot pitch from slot S4. The following portion of wire 31 is hooked on terminal 30 of segment C9 that is separate a four-segment pitch from segment C4.

Figure 1B:
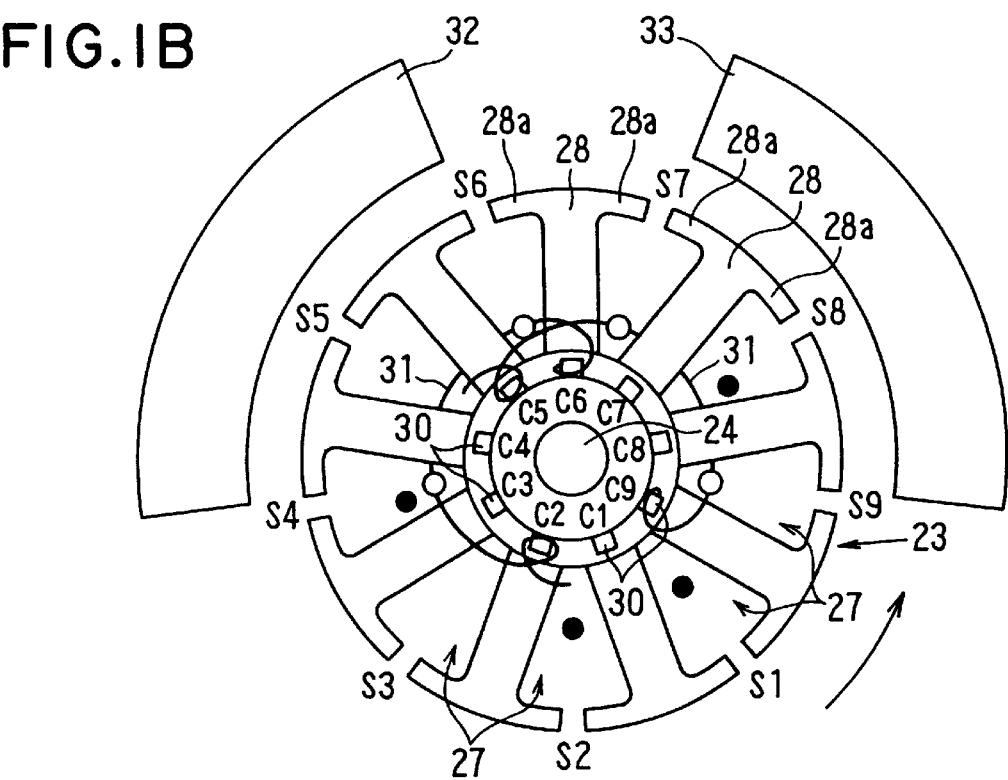

Second Step: As shown in FIG. 1B, armature 23 is rotated in the direction indicated by an arrow (counter-clockwise) by 200 degree, that is 180+180/(4m+1) degree when m is 2, in angle so that slot S6 can be located where slot S1 is located. The following portion of wire 31 extending from segment C6 is wound around first former 32 and guided into slot S6 and slot S4 that is separate two-slot pitch from slot S6. Thereafter, the following portion of wire 31 is hooked on terminal 30 of segment C2 that is separate a four-segment pitch from segment C6. On the other hand, the following portion of another wire 31 extending from segment C9 is concurrently wound around second former 33 and guided into slot S9 and slot S7 that is separate two-slot pitch from slot S9. The following portion of wire 31 is hooked on terminal 30 of segment C5 that is separate a four-segment pitch from segment C9.

Third Step: As shown in FIG. 2A, armature 23 is rotated counter-clockwise by 200 degree in angle so that slot S2 can be located where slot S6 is located. The following portion of wire 31 extending from segment C2 is wound around first former 32 and guided into slot S2 and slot S9 that is separate two-slot pitch from slot S2. Thereafter, the following portion of wire 31 is hooked on terminal 30 of segment C7 that is separate a four-segment pitch from segment C2. On the other hand, the following portion of another wire 31 extending from segment C5 is concurrently wound around second former 33 and guided into slot S5 and slot S3 that is separate two-slot pitch from slot S9. The following portion of wire 31 is hooked on terminal 30 of segment C1 that is separate a four-segment pitch from segment C5, and a portion of another wire 31 extending from terminal 30 of segment C1 is cut.

Fourth Step: As shown in FIG. 2B, armature 23 is rotated counter-clockwise by 200 degree in angle so that slot S7 can be located where slot S2 is located. The following portion of wire 31 extending from segment C7 is wound around first former 32 and guided into slot S7 and slot S5 that is separate two-slot pitch from slot S7. Thereafter, the following portion of wire 31 is hooked on terminal 30 of segment C3 that is separate a four-segment pitch from segment C2.

Fifth Step: As shown in FIG. 3A, armature 23 is rotated counter-clockwise by 200 degree in angle so that slot S3 can be located where slot S7 is located. The following portion of wire 31 extending from segment C3 is wound around first former 32 and guided into slot S3 and slot S1 that is separate two-slot pitch from slot S3. Thereafter, the following portion of wire 31 is hooked on terminal 30 of segment C8 that is separate a four-segment pitch from segment C3.

Sixth Step: As shown in FIG. 3B, armature 23 is rotated counter-clockwise by 200 degree in angle so that slot S8 can be located where slot S3 is located. The following portion of wire 31 extending from segment C8 is wound around first former 32 and guided into slot S8 and slot S6 that is separate two-slot pitch from slot S8. Thereafter, the following portion of wire 31 is hooked on terminal 30 of segment C4 that is separate a four-segment pitch from segment C8. A portion of wire 31 extending from terminal 30 of segment C4 is cut. Thus, the winding is completed through the above six steps.

(Second Embodiment)

A second embodiment is described with reference to FIGS. 5A–8.

Motor 21 is substantially the same in structure and composed of a motor housing, armature 23, shaft 24, four magnetic poles and a cylindrical commutator. Four magnetic poles are disposed at equal intervals on the inner periphery of the motor housing to surround armature 23. Armature 23 has thirteen slots 27. Armature 23 has thirteen core members 28 having teeth 28a circumferentially extending in the opposite directions to cover the adjacent slots. The commutator is composed of thirteen arc-shaped commutator segments. Each of the commutator segments has rise-up terminal 30 which is shifted in angle from the center of each of slots 27. Wire 31 is wound to core members 28 and fixed to terminal 30.

Figure 5A:
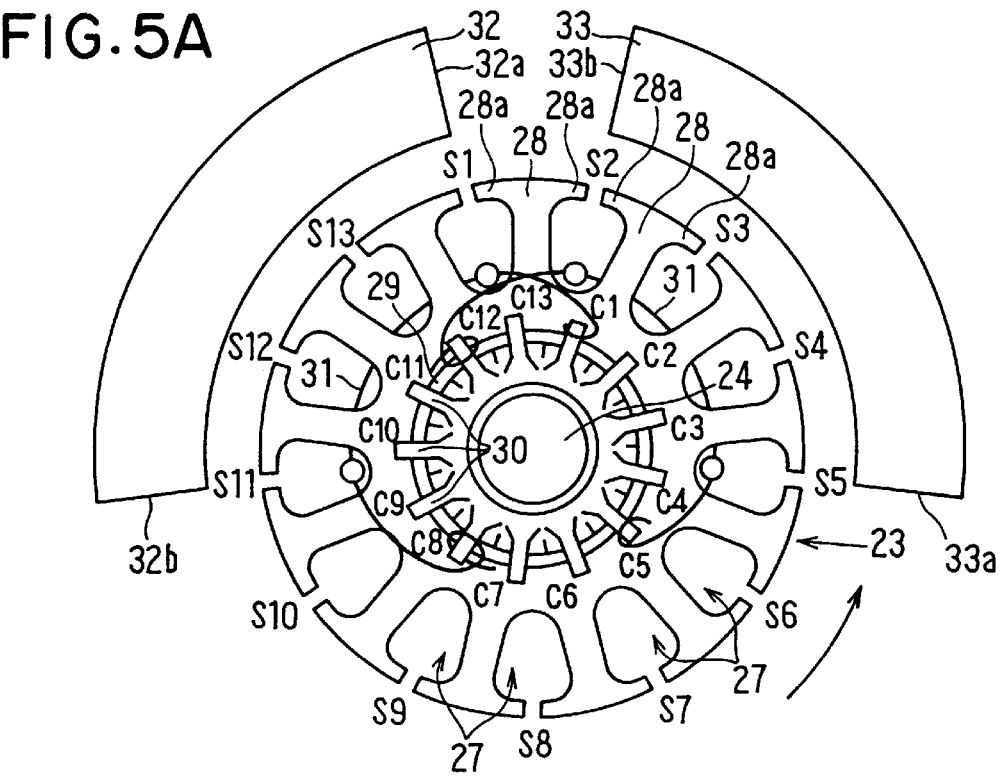
FIGS. 5A and 5B are schematic diagrams illustrating a method of winding an armature coil to an armature core according to a second embodiment of the invention.

As shown in FIG. 5A, each of first and second coil formers 32, 33 has opposite guiding surfaces for guiding wires into two slots disposed at a three-slot pitch corresponding to a one-pole pitch. Wire 31 is wound around each of formers 32, 33 and inserted in the corresponding slots 27 by one of the flyers stated in the first embodiment. The winding is carried out through the following eight steps.

First Step: As shown in FIG. 5A, an end of wire 31 is hooked on rise-up terminal 30 of commutator segment C1, and the following portion of wire 31 is wound around first former 32 and guided into slot S1 and slot S11 that is separate a three-slot pitch from slot Si. Thereafter, the following portion of wire 31 is hooked on terminal 30 of segment C8 that is separate a six-segment pitch from segment C1. On the other hand, an end of another wire 31 is concurrently hooked on rise-up member 30 of commutator segment C5, and the following portion of wire 31 is wound around second former 33 and guided into slot S5 and slot S2 that is separate a three-slot pitch from slot S5. Thereafter, the following portion of wire 31 is hooked on terminal 30 of segment C12 that is separate a six-segment pitch from segment C5.

Figure 5B:
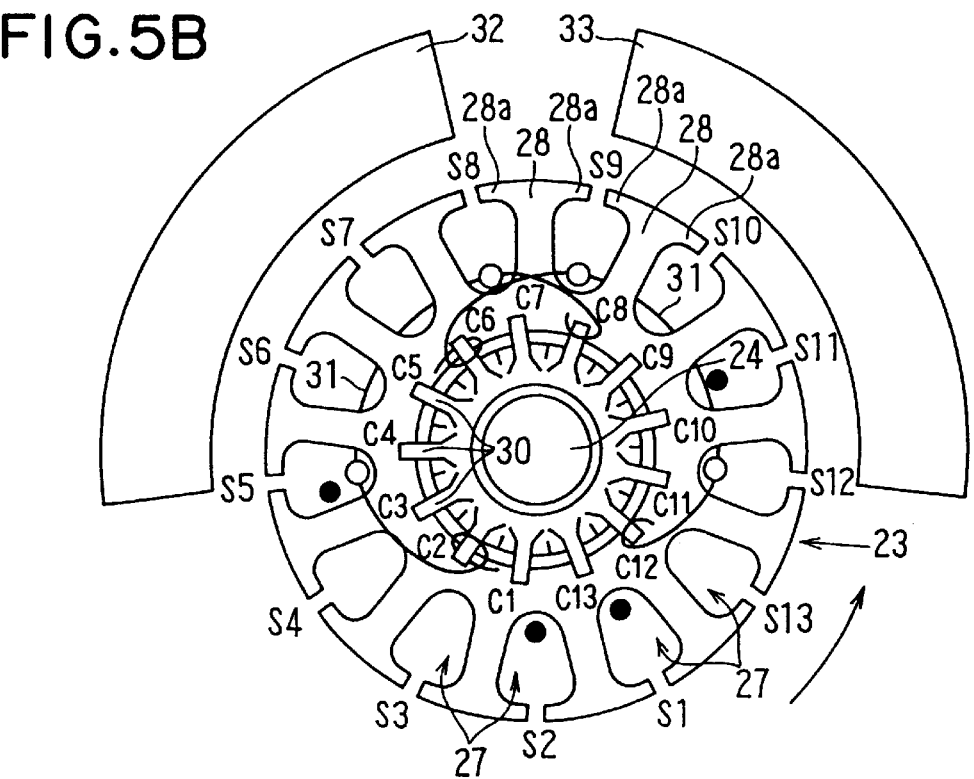

Second Step: As shown in FIG. 5B, armature 23 is rotated counter-clockwise by 193.8 degree, that is 180+180/(4m+1) degree when m is 3, in angle so that slot S8 can be located where slot S1 is located. The following portion of wire 31 extending from segment C8 is wound around first former 32 and guided into slot S8 and slot S5 that is separate a three-slot pitch from slot S8. The following portion of wire 31 is hooked on terminal 30 of segment C2 that is separate a six-segment pitch from segment C8. On the other hand, the following portion of another wire 31 extending from segment C12 is concurrently wound around second former 33 and guided into slot S12 and slot S9 that is separate a three-slot pitch from slot S12. The following portion of wire 31 is hooked on terminal 30 of segment C6 that is separate a six-segment pitch from segment C12.

Figure 6A:
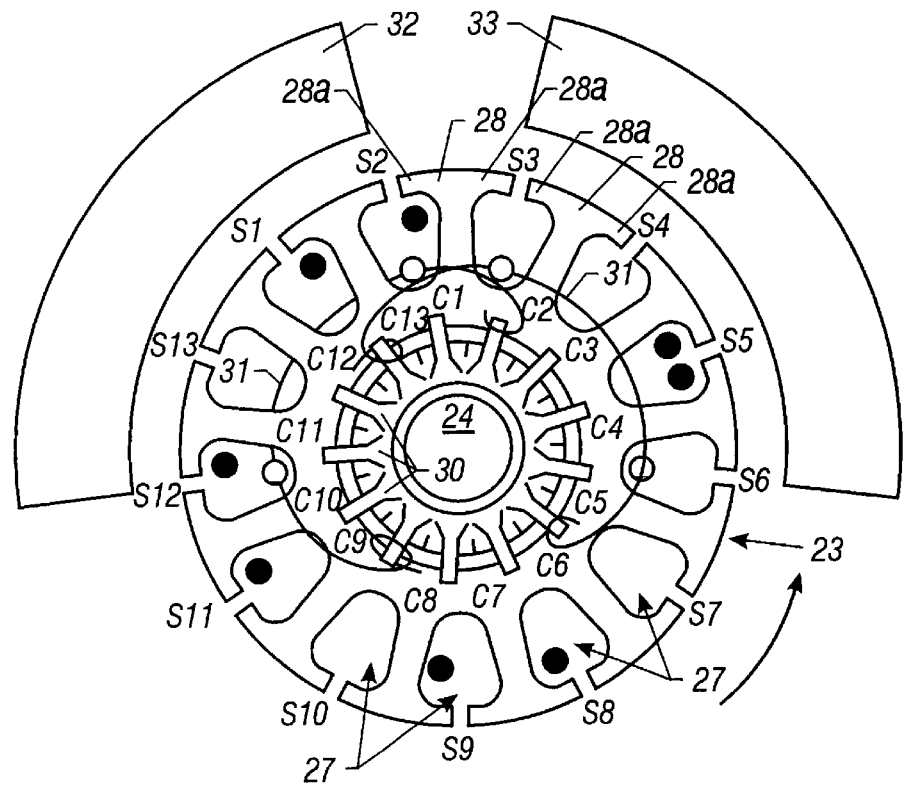
FIGS. 6A and 6B are schematic diagrams illustrating the method of winding an armature coil to an armature core according to the second embodiment.

Third Step: As shown in FIG. 6A, armature 23 is rotated counter-clockwise by 193.8 degree in angle so that slot S8 can be located where slot S1 is located. The following portion of wire 31 extending from segment C2 is wound around first former 32 and guided into slot S2 and slot S12 that is separate a three-slot pitch from slot S2. The following portion of wire 31 is hooked on terminal 30 of segment C9 that is separate a six-segment pitch from segment C2. On the other hand, the following portion of another wire 31 extending from segment C6 is concurrently is wound around second former 33 and guided into slot S6 and slot S3 that is separate a three-slot pitch from slot S6. Thereafter, the following portion of wire 31 is hooked on terminal 30 of segment C13 that is separate a six-segment pitch from segment C6.

Figure 6B:
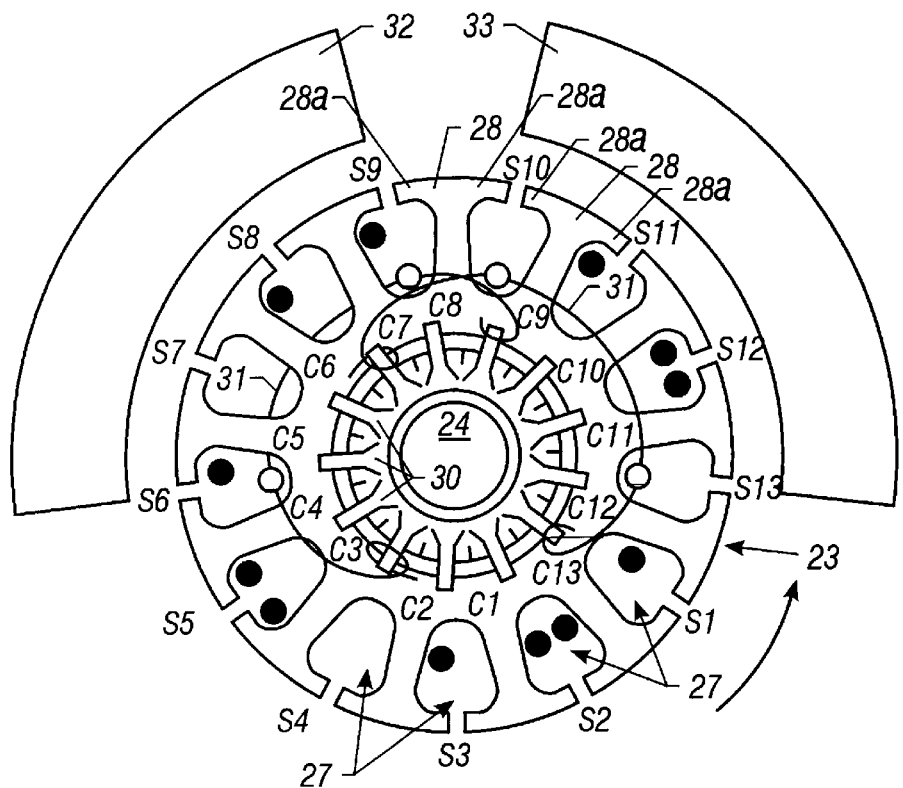

Fourth Step: As shown in FIG. 6B, armature 23 is rotated counter-clockwise by 193.8 degree in angle so that slot S9 can be located where slot S2 is located. The following portion of wire 31 extending from segment C9 is wound around first former 32 and guided into slot S9 and slot S6 that is separate a three-slot pitch from slot S9. The following portion of wire 31 is hooked on terminal 30 of segment C3 that is separate a six-segment pitch from segment C9. On the other hand, the following portion of another wire 31 extending from segment C13 is concurrently is wound around second former 33 and guided into slot S13 and slot S10 that is separate a three-slot pitch from slot S13. The following portion of wire 31 is hooked on terminal 30 of segment C7 that is separate a six-segment pitch from segment C13.

Figure 7A:
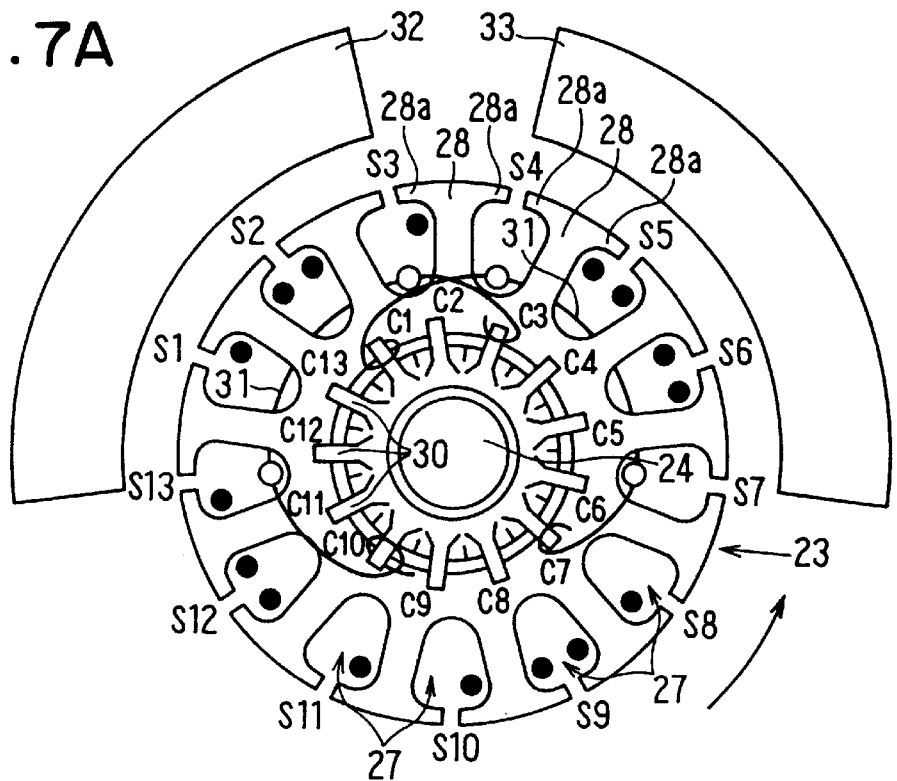
FIGS. 7A and 7B are schematic diagrams illustrating the method of winding an armature coil to an armature core according to the second embodiment.

Fifth Step: As shown in FIG. 7A, armature 23 is rotated counter-clockwise by 193.8 degree in angle so that slot S3 can be located where slot S9 is located. The following portion of wire 31 extending from segment C3 is wound around first former 32 and guided into slot S3 and slot S13 that is separate a three-slot pitch from slot S3. The following portion of wire 31 is hooked on terminal 30 of segment C10 that is separate a six-segment pitch from segment C3. On the other hand, the following portion of another wire 31 extending from segment C7 is concurrently is wound around second former 33 and guided into slot S7 and slot S4 that is separate a three-slot pitch from slot S7. Thereafter, the following portion of wire 31 is hooked on terminal 30 of segment C1 that is separate a six-segment pitch from segment C13, and a portion of another wire 31 extending from terminal 30 of segment C1 is cut. Thus, the concurrent winding by coil former 32, 33 is finished.

Figure 7B:
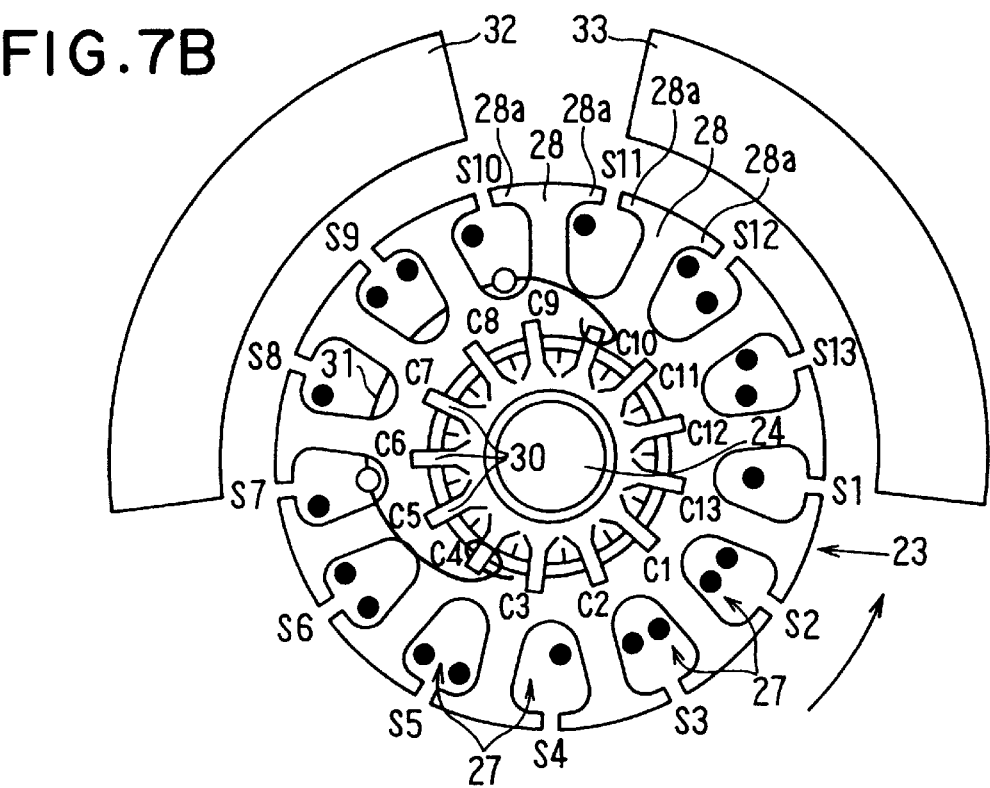

Sixth Step: As shown in FIG. 7B, armature 23 is rotated counter-clockwise by 193.8 degree in angle so that slot S10 can be located where slot S3 is located. The following portion of wire 31 extending from segment C10 is wound around first former 32 and guided into slot S10 and slot S7 that is separate a three-slot pitch from slot S10. The following portion of wire 31 is hooked on terminal 30 of segment C4 that is separate a six-segment pitch from segment C10.

Figure 8A:
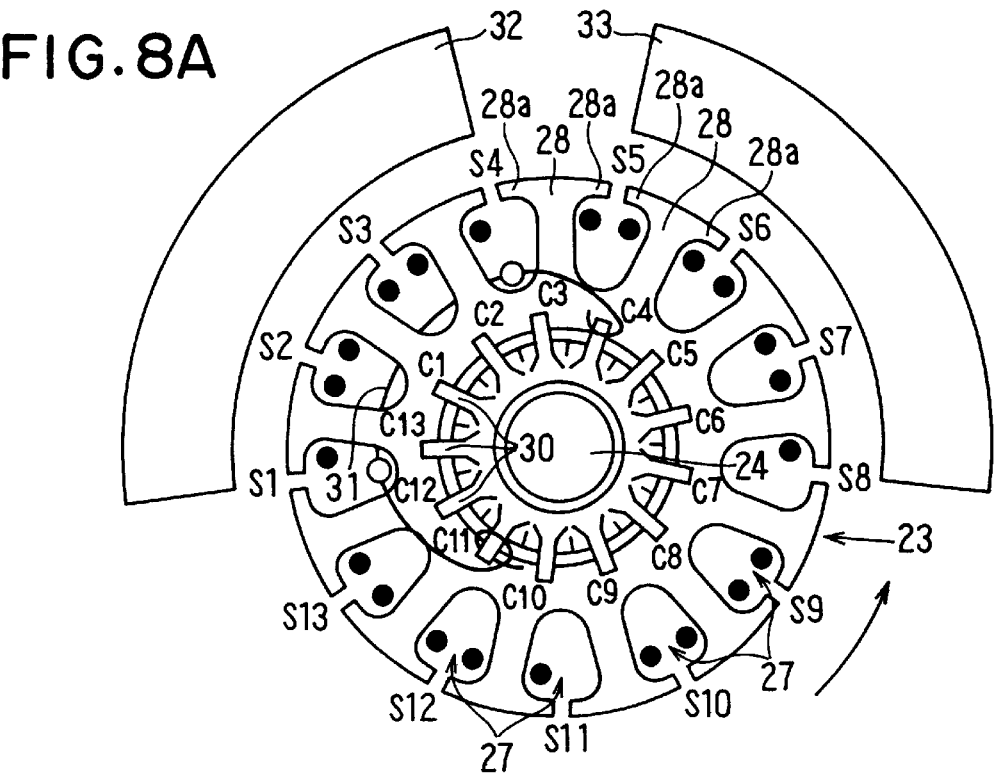
FIGS. 8A and 8B are schematic diagrams illustrating the method of winding an armature coil to an armature core according to the second embodiment.

Seventh Step: As shown in FIG. 8A, armature 23 is rotated counter-clockwise by 193.8 degree in angle so that slot S4 can be located where slot S10 is located. The following portion of wire 31 extending from segment C4 is wound around first former 32 and guided into slot S4 and slot S1 that is separate a three-slot pitch from slot S4. The following portion of wire 31 is hooked on terminal 30 of segment C11 that separate a six-segment pitch from segment C4.

Figure 8B:
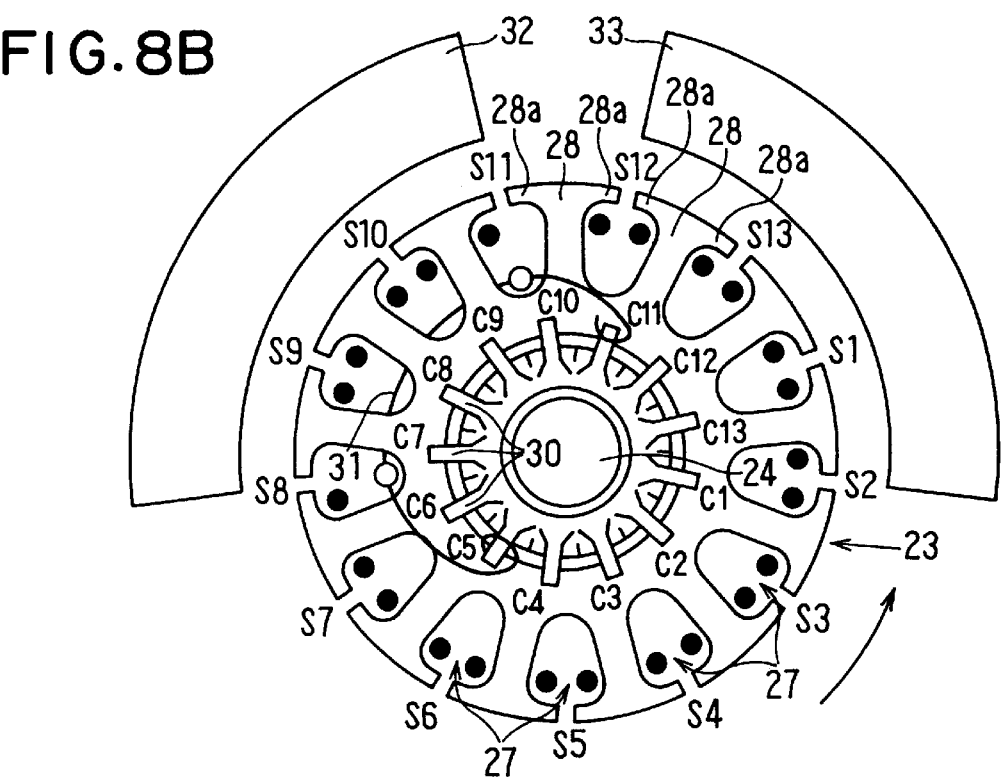

Eighth Step: As shown in FIG. 8B, armature 23 is rotated counter-clockwise by 193.8 degree in angle so that slot S11 can be located where slot S4 is located. The following portion of wire 31 extending from segment C11 is wound around first former 32 and guided into slot S11 and slot S8 that is separate a three-slot pitch from slot S11. Thereafter, the following portion of wire 31 is hooked on terminal 30 of segment C5 that is separate a six-segment pitch from segment C11. A portion of wire 31 extending from terminal 30 of segment C5 is cut. Thus, the winding is completed through the above eight steps.

(Third Embodiment)

A third embodiment is described with reference to FIGS. 9A–9D.

Figure 9A:
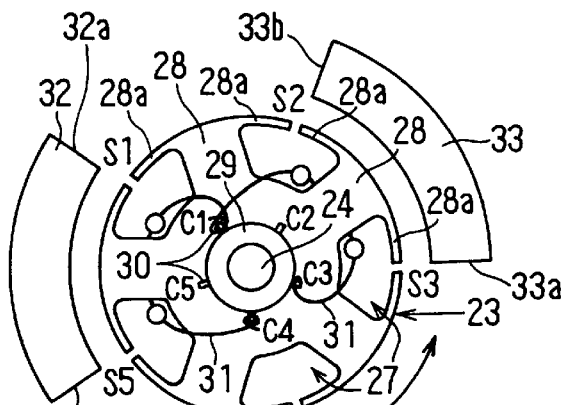
FIGS. 9A, 9B, 9C and 9D are schematic diagrams illustrating a method of winding an armature coil to an armature core according to a third embodiment of the invention.

Motor 21 is substantially the same in structure and composed of a motor housing, armature 23, shaft 24, four magnetic poles and a cylindrical commutator. Four magnetic poles are disposed at equal intervals on the inner periphery of the motor housing to surround armature 23. Armature 23 has five slots 27. The number five is one of the numbers that can be expressed by expression (4m+1) when m is 1. Armature 23 has five core members 28 having teeth 28a circumferentially extending in the opposite directions over the adjacent slots. The commutator is composed of five arc-shaped commutator segments. Each of the commutator segments has rise-up terminal 30 which is shifted in angle from the center of each of slots 27. As shown in FIG. 9A, each of first and second coil formers 32, 33 has the opposite guiding surfaces at a one-slot pitch corresponding to a one-pole pitch. First and second coil formers 32, 33 are disposed around armature 23 so that one of core members 28 is disposed therebetween. Wire 31 is wound around each of formers 32, 33 and inserted in the corresponding slots 27 by one of the flyers stated in the first embodiment. The winding is completed through the following four steps.

First Step: As shown in FIG. 9A, an end of wire 31 is hooked on rise-up terminal 30 of commutator segment C1, and the following portion of wire 31 is wound around first former 32 and guided into slot S1 and slot S5 that is separate one-slot pitch from slot S1. Thereafter, the following portion of wire 31 is hooked on rise-up terminal 30 of segment C4 that is separate a two-segment pitch from segment C1. On the other hand, an end of another wire 31 is concurrently hooked on rise-up terminal 30 of commutator segment C3, and the following portion of wire 31 is wound around second former 33 and guided into slot C3 and slot S2 that is separate one-slot pitch from slot S3. Thereafter, the following portion of wire 31 is hooked on terminal 30 of segment C1 that is separate a two-segment pitch from segment C3. A portion of wire 31 extending from segment C1 is cut.

Figure 9B:
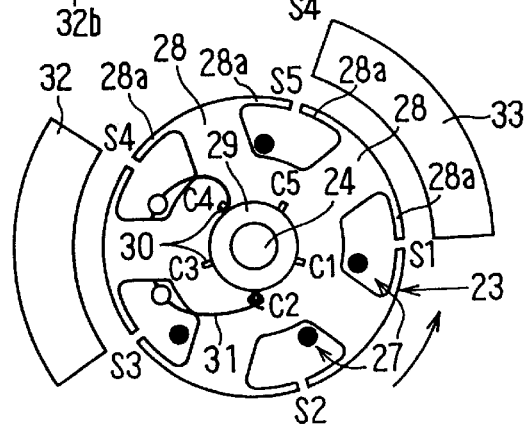

Second Step: As shown in FIG. 9B, armature 23 is rotated counter-clockwise by 216 degree in angle, which is the angle 180+180/(4m+1) when m is 1, so that slot S4 can be located where slot S1 is located. The following portion of wire 31 extending from segment C4 is wound around first former 32 and guided into slot S4 and slot S3 that is separate one-slot pitch from slot S4. Then, the following portion of wire 31 is hooked on terminal 30 of segment C2 that is separate a two-segment pitch from segment C4.

Figure 9C:
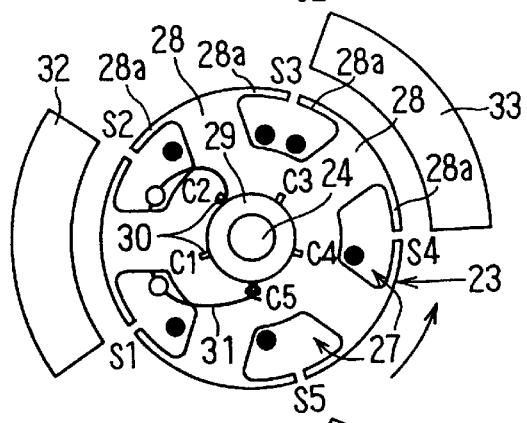

Third Step: As shown in FIG. 9C, armature 23 is rotated counter-clockwise by 216 degree in angle so that slot S2 can be located where slot S4 is located. The following portion of wire 31 extending from segment C2 is wound around first former 32 and guided into slot S2 and slot S1 that is separate one-slot pitch from slot S2. Thereafter, the following portion of wire 31 is hooked on terminal 30 of segment C5 that is separate a two-segment pitch from segment C2.

Figure 9D:
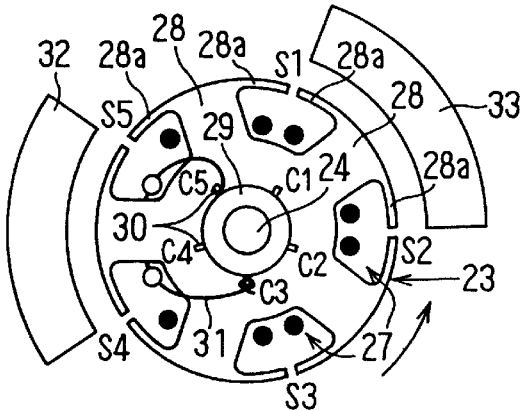

Fourth Step: As shown in FIG. 9D, armature 23 is rotated counter-clockwise by 216 degree in angle so that slot S5 can be located where slot S2 is located. The following portion of wire 31 extending from segment C5 is wound around first former 32 and guided into slot S5 and slot S4 that is separate one-slot pitch from slot S5. Then, the following portion of wire 31 is hooked on terminal 30 of segment C3 that is separate a two-segment pitch from segment C5. A portion of wire 31 extending from terminal 30 of segment C3 is cut. Thus, the winding is completed through the above four steps.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A method of winding an armature of a four-poled dc motor composed of said armature having (4m+1) slots, with m being a natural number, between adjacent core members and a commutator having the same number of commutator segments as said slots, said method comprising:

a first step of placing on said core members a first and second coil formers, so that only one of said core members is placed between said first and second coil formers, each of which has a pair of guiding surfaces around said armature so that said pair of guiding surfaces of said first coil former is located to guide a wire into a first pair of said slots disposed at an m-slot pitch from each other and said pair of guiding surfaces of said second former is located to guide another wire into a second pair of said slots disposed at an m-slot pitch form each other; and a second step of winding said wires respectively on said first and second coil formers concurrently to guide said wires into said first and second pair of slots respectively.

2. The method of winding as claimed in claim 1, further comprising:

a third step of rotating said armature at an angle of $180+180/(4m+1)$ degrees; and a fourth step of winding wires on said first and second coil formers concurrently to guide said wires into another two pair of slots disposed at an m-slot pitch from each other respectively.

3. The method of winding as claimed in claim 2 further comprising:

a fifth step of repeating said third and fourth steps (2m−2) times.

4. The method of winding as claimed in claim 4 further comprising:

a sixth step of rotating said armature at an angle $180+180/(4m+1)$ degree;

a seventh step of winding said wire on said first coil former to guide said wire into another pair of slots to be wound at an m-slot pitch; and an eighth step of repeating said sixth and seventh steps two times.

5. The method of winding an armature as claimed in claim 4, wherein said m is a number selected from numbers 1, 2 and 3.

6. A method of winding an armature of a four-poled dc motor composed of said armature having nine slots between adjacent core members and a commutator having the same number of commutator segments as said slots, said method comprising:

a first step of placing on opposite sides of one of said core members a first and second coil formers each of which has a pair of guiding surfaces around said armature so that said pair of guiding surfaces of said first coil former is located to guide a wire into a first pair of said slots disposed at a two-slot pitch from each other and said pair of guiding surfaces of said second former is located to guide another wire into a second pair of said slots disposed at a two-slot pitch from each other;

a second step of winding said wires respectively on said first and second coil formers concurrently to guide said wires into said first and second pair of slots respectively;

a third step of rotating said armature at an angle of 200 degree;

a fourth step of winding wires on said first and second coil formers concurrently to guide said wires into another two pair of slots disposed at a two-slot pitch from each other respectively;

a fifth step of repeating said third and fourth steps two times;

a sixth step of rotating said armature at an angle of 200 degree;

a seventh step of winding said wire on said first coil former to guide said wire into another pair of slots to be wound at a two-slot pitch; and an eighth step of repeating said sixth and seventh steps two times.

7. A method of winding an armature of a four-poled dc motor composed of said armature having thirteen slots between adjacent core members and a commutator having the same number of commutator segments as said slots, said method comprising:

a first step of placing on opposite sides of one of said core members a first and second coil formers each of which has a pair of guiding surfaces around said armature so that said pair of guiding surfaces of said first coil former is located to guide a wire into a first pair of said slots disposed at a three-slot pitch from each other and said pair of guiding surfaces of said second former is located to guide another wire into a second pair of said slots disposed at a three-slot pitch from each other;

a second step of winding said wires respectively on said first and second coil formers concurrently to guide said wires into said first and second pair of slots respectively;

a third step of rotating said armature at an angle of 193.8 degree;

a fourth step of winding wires on said first and second coil formers concurrently to guide said wires into another two pair of slots disposed at a three-slot pitch from each other respectively;

a fifth step of repeating said third and fourth steps four times;

a sixth step of rotating said armature at an angle of 193.8 degree;

a seventh step of winding said wire on said first coil former to guide said wire into another pair of slots to be wound at a three-slot pitch; and an eighth step of repeating said sixth and seventh steps two times.

8. A method of winding an armature of a four-poled dc motor composed of said armature having five slots between adjacent core members and a commutator having the same number of commutator segments as said slots, said method comprising:

a first step of placing on opposite sides of one of said core members a first and second coil formers each of which has a pair of guiding surfaces around said armature so that said pair of guiding surfaces of said first coil former is located to guide a wire into a first pair of said slots disposed at a one-slot pitch from each other and said pair of guiding surfaces of said second former is located to guide another wire into a second pair of said slots disposed at a one-slot pitch from each other;

a second step of winding said wires respectively on said first and second coil formers concurrently to guide said wires into said first and second pair of slots respectively;

a third step of rotating said armature at an angle of 216 degree;

a fourth step of winding said wire on said first coil former to guide said wire into another pair of slots to be wound at a one-slot pitch; and a fifth step of repeating said sixth and seventh steps two times.

* * * * *